(12) United States Patent
Reggio et al.

(10) Patent No.: US 8,587,252 B2
(45) Date of Patent: Nov. 19, 2013

(54) SYSTEM AND METHOD FOR DIGITAL CONTROL OF A DC/DC POWER-CONVERTER DEVICE, IN PARTICULAR FOR AUTOMOTIVE APPLICATIONS

(75) Inventors: Paolo Reggio, Orbassano (IT);
Giuseppe Catona, Orbassano (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 330 days.

(21) Appl. No.: 13/113,002

(22) Filed: May 20, 2011

(65) Prior Publication Data

US 2012/0126742 A1    May 24, 2012

(30) Foreign Application Priority Data

May 21, 2010   (EP) .................................. 10425172

(51) Int. Cl.
*H01M 10/44* (2006.01)
*H01M 10/46* (2006.01)

(52) U.S. Cl.
USPC ........................................................ 320/104

(58) Field of Classification Search
USPC ................. 320/104, 107, 135, 137, 140, 143;
363/21.05, 97, 131; 323/225, 268, 282, 323/285
See application file for complete search history.

(56) References Cited

U.S. PATENT DOCUMENTS

| | | | |
|---|---|---|---|
| 5,272,614 A | 12/1993 | Brunk et al. | |
| 5,590,033 A | 12/1996 | Kawano | |
| 6,906,500 B2 * | 6/2005 | Kernahan | 323/225 |
| 7,292,009 B2 * | 11/2007 | Kawakami et al. | 322/29 |
| 8,013,580 B2 * | 9/2011 | Cervera et al. | 323/268 |
| 8,040,703 B2 * | 10/2011 | Melanson | 363/89 |
| 2007/0133239 A1 | 6/2007 | Tanaka | |
| 2008/0303501 A1 | 12/2008 | Prodic | |

OTHER PUBLICATIONS

European Search Report for European Patent Application No. EP 10425172 dated Oct. 28, 2010.

* cited by examiner

*Primary Examiner* — Edward Tso
(74) *Attorney, Agent, or Firm* — Dorsey & Whitney LLP

(57) ABSTRACT

A system for controlling a power-converter device of a DC/DC type, having an input connected to a first electric battery at an input voltage, and an output connected to a second electric battery at an output voltage, and being provided with: a transformer stage, with a primary winding coupled to the input, and a secondary winding coupled to the output; a switching stage, arranged between the input and the primary winding and supplying an alternating electrical quantity to the primary winding as a function of the input voltage; a rectifier stage arranged between the secondary winding and the output for generating the output voltage. A control stage switching controls the switching stage at a switching frequency, as a function of a measurement signal indicative of an electrical output quantity, by means of a digital average-current-mode control, obtaining the measurement signal by means of a subsampling of the electrical output quantity, at a sampling frequency, lower than the switching frequency.

15 Claims, 2 Drawing Sheets

SYSTEM AND METHOD FOR DIGITAL CONTROL OF A DC/DC POWER-CONVERTER DEVICE, IN PARTICULAR FOR AUTOMOTIVE APPLICATIONS

CROSS-REFERENCE TO RELATED APPLICATIONS

This application claims priority to European Patent Application No. 10425172.3 filed May 21, 2010, the disclosure of which is incorporated herein by this reference.

TECHNICAL FIELD

Example embodiments regard a system and a method for digital control of a power-converter device of a DC/DC type (i.e., from d.c. voltage to d.c. voltage), in particular for recharging a low-voltage electric battery starting from a high-voltage electric battery. The following disclosure will make explicit reference, without this implying any loss of generality, to the use of the power-converter device in automotive applications, wherein the low-voltage electric battery is the service battery of a vehicle, for example a hybrid vehicle, whilst the high-voltage electric battery is a traction battery for driving the vehicle.

BACKGROUND

Hybrid electric vehicles are known, which are equipped with a power-train, comprising a thermal engine with small engine displacement, and a dual-dry-clutch transmission (DDCT) integrating an electrical machine operating as electric motor/generator, which can be activated, among other operations, for starting the thermal engine in lieu of the starting motor.

The hybrid power-train is, for example, able to perform the following functions: engine stop and start through the electric driving motor; launch and creep in electrical mode; economy gear shifting; regenerative braking; and electric torque boost.

These electric vehicles are equipped for their operation with a high-voltage electric battery (which supplies, for example, a rated voltage of 240 V), the so-called <<traction battery>>, which can also be recharged directly from the power mains, and with a low-voltage electric battery (which supplies, for example, a rated voltage of 12 V), the so-called <<service battery>>, which is recharged starting from the traction battery. In particular, the service battery is designed to supply a wide range of electrical loads of the vehicle, such as, for example, the lights, the air-conditioning assembly, or other low-power actuator assemblies. The aforesaid electric vehicles are moreover equipped with an electrical power drive, including inter alia: a high-voltage battery-charger for charging the traction battery starting from the power mains, made up of a power-factor-corrector (PFC) stage, cascaded to which is a voltage-reduction (<<buck>> or <<step-down>>) stage; and a low-voltage battery-charger for charging the service battery starting from the traction battery, constituted basically by a DC/DC converter device.

In particular, the DC/DC converter device, generally known in the technical field as a "power transfer device", replaces the function traditionally performed by the alternator in charging the service battery and can control the recharging profile, supplying appropriate output voltages and currents (and hence powers).

The possibility is known, in this regard, of implementing appropriate algorithms for controlling a power converter (for example, the aforesaid DC/DC converter device) in a digital way, with the aid of a microprocessor or microcontroller (or similar computing and processing tool), which has been appropriately programmed.

In the example of application illustrated previously, the vehicle can, for example, be equipped with a microprocessor or microcontroller, designed to implement the strategies for control both of the high-voltage battery-charger and of the low-voltage battery-charger.

The use of a digital control system, albeit advantageous from many points of view, amongst which that of enabling a wide configurability and programmability of the control action, has the drawback of involving production costs that may even be high, linked mainly to the use of a microprocessor or microcontroller; these costs are, in particular, the higher, the higher the computing and processing power required from the same microprocessor or microcontroller.

In this regard, in the case of switching power-converter devices, the need to adopt high switching frequencies so as to reduce (in a known way) the dimensions of the analog circuit components used, comes up against the consequent need to use so-called <<high-range>> microprocessors or microcontrollers, i.e., ones capable of operating at high working frequencies (even of the order of hundreds of kilohertz), and with the consequent increase in the costs associated to the use of these components.

This disadvantage is particularly felt in the automotive sector, where, as is known, the production costs play a frequently determining role in the design choices.

SUMMARY OF AN EXAMPLE EMBODIMENT

One example embodiment is directed to a power-converter device for recharging an electric battery having a digital control system, having high performance and contained production costs.

A system and a corresponding method for digital control of a power-converter device are consequently provided.

BRIEF DESCRIPTION OF THE DRAWINGS

For a better understanding of the present invention, an example embodiment thereof is now described, purely by way of non-limiting example, with reference to the attached drawings, wherein.

DETAILED DESCRIPTION

Figure 1:
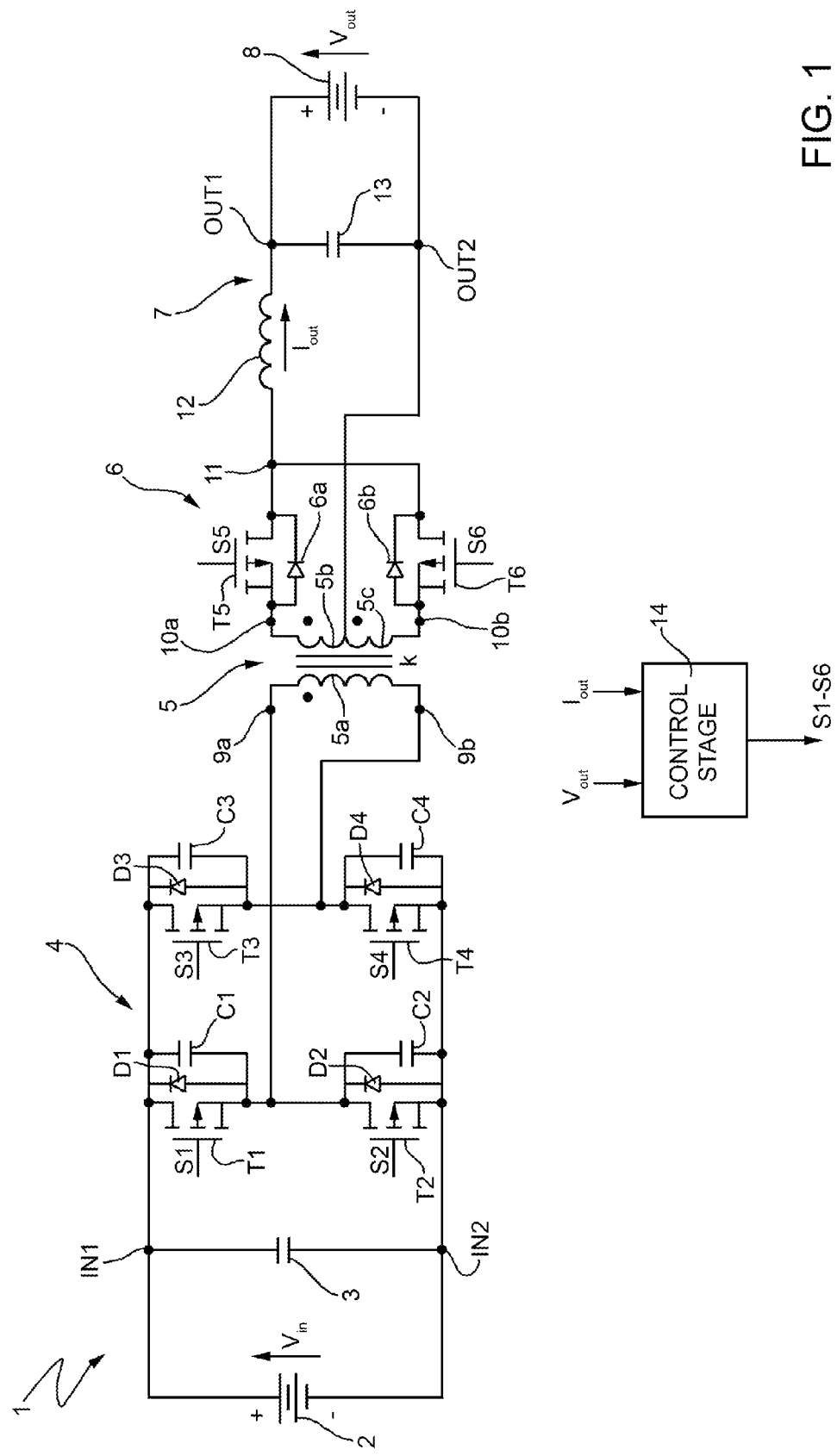
FIG. 1 shows a circuit diagram of a power-converter device, implementing the present invention.

FIG. 1 shows a power-converter device, designated as a whole by 1, of a DC/DC <<full-bridge forward>> type with resonant zero-voltage transition (ZVT) with synchronous rectification on the secondary.

The power-converter device 1 has a first input terminal IN1 and a second input terminal IN2, which are designed to be connected, respectively, to the positive pole and to the negative pole of a first, high-voltage, electric battery 2, for example a traction battery of a hybrid electric vehicle, which supplies an input voltage, for example with a rated value of 240 V; a decoupling capacitor 3 is connected between the first and second input terminals IN1, IN2. The power-converter device 1 comprises: a power-switching stage 4; a transformer 5, of the central-tap type; a rectifier stage 6; and an output filter stage 7, connected to a first output terminal OUT1 and a second output terminal OUT2 of the power-converter device 1, connected between which is a second, low-voltage, electric battery 8, for example a service battery of a hybrid electric vehicle, present on which is an output voltage Vout, for example of a rated value of 12 V (the rectifier stage 6 and the output filter stage 7 hence operating to supply a rectified voltage of a substantially constant value across the second electric battery 8). It is to be noted that the power-converter device 1 hence operates in buck mode, as a galvanically insulated voltage reducer (from the primary to the secondary of the transformer 5).

The power switching stage 4 comprises four transistors T1-T4, for example MOSFETs, which are controlled so as to operate as switches and switch between a closed condition and an open condition, and are arranged in a full-bridge (so-called <<H-bridge>>) configuration; the power switching stage 4 operates as a DC/AC converter (or inverter) so as to supply an alternating current to the primary of the transformer 5.

In greater detail, a first transistor T1 is connected between the first input terminal IN1 and a first internal node 9a, and has a control terminal receiving a first command signal S1; a second transistor T2 is connected between the first internal node 9a and the second input terminal IN2, and has a control terminal receiving a second command signal S2; a third transistor T3 is connected between the first input terminal IN1 and a second internal node 9b, and has a control terminal receiving a third command signal S3; and a fourth transistor T4 is connected between the second internal node 9b and the second input terminal IN2, and has a control terminal receiving a fourth command signal S4. As shown schematically in FIG. 1, a respective parasitic capacitor C1-C4 and a respective drain-source diode D1-D4 are present between the current-conduction terminals of each transistor T1-T4, (these components are intrinsic to the structure of each transistor T1-T4).

The transformer 5, which operates for electrical insulation and voltage adaptation, comprises: a primary winding 5a, connected between the first internal node 9a and the second internal node 9b; and a secondary, with central tap connected to the second output terminal OUT2. In detail, the secondary of the transformer 5 has: a first half-winding 5b connected between the central tap (and hence the second output terminal OUT2) and a third internal node 10a; and a second half-winding 5c connected between the central tap and a fourth internal node 10b. The transformer 5 defines a transformation ratio k, of a desired value (lower than one), between the primary and the secondary.

The rectifier stage 6 is connected to the secondary of the transformer 5 and comprises: a first diode element 6a, having its anode connected to the third internal node 10a and its cathode connected to a fifth internal node 11; and a second diode element 6b, having its anode connected to the fourth internal node 10b and its cathode connected to the fifth internal node 11. In particular, the first and second diode elements 6a, 6b are constituted by the intrinsic drain-source diodes of a respective fifth transistor T5 and sixth transistor T6, for example once again of a MOSFET type, which receive, at a respective control terminal, a fifth command signal S5 and a sixth command signal S6, respectively. As described hereinafter, transistors T5, T6 are actuated synchronously with the operation of the power switching stage 4, which is connected to the primary of the transformer 5; this operating mode is referred to, in the technical jargon, as <<synchronous rectification>>.

The output filter stage 7, of an LC type, comprises: a filter inductor 12, which is connected between the fifth internal node 11 and the first output terminal OUT1 and through which an output current Iout is designed to flow; and a filter capacitor 13, which is connected in parallel to the second electric battery 8, between the first and second output terminals OUT1, OUT2, and across the terminals of which the output voltage Vout is hence present.

The power-converter device 1 further comprises a control stage 14, shown schematically in FIG. 1, electrically coupled to the power switching stage 4, to the rectifier stage 6, and to the output filter stage 7, and configured so as to provide a digital control action, in particular of the average-current-mode-control type.

Figure 2:
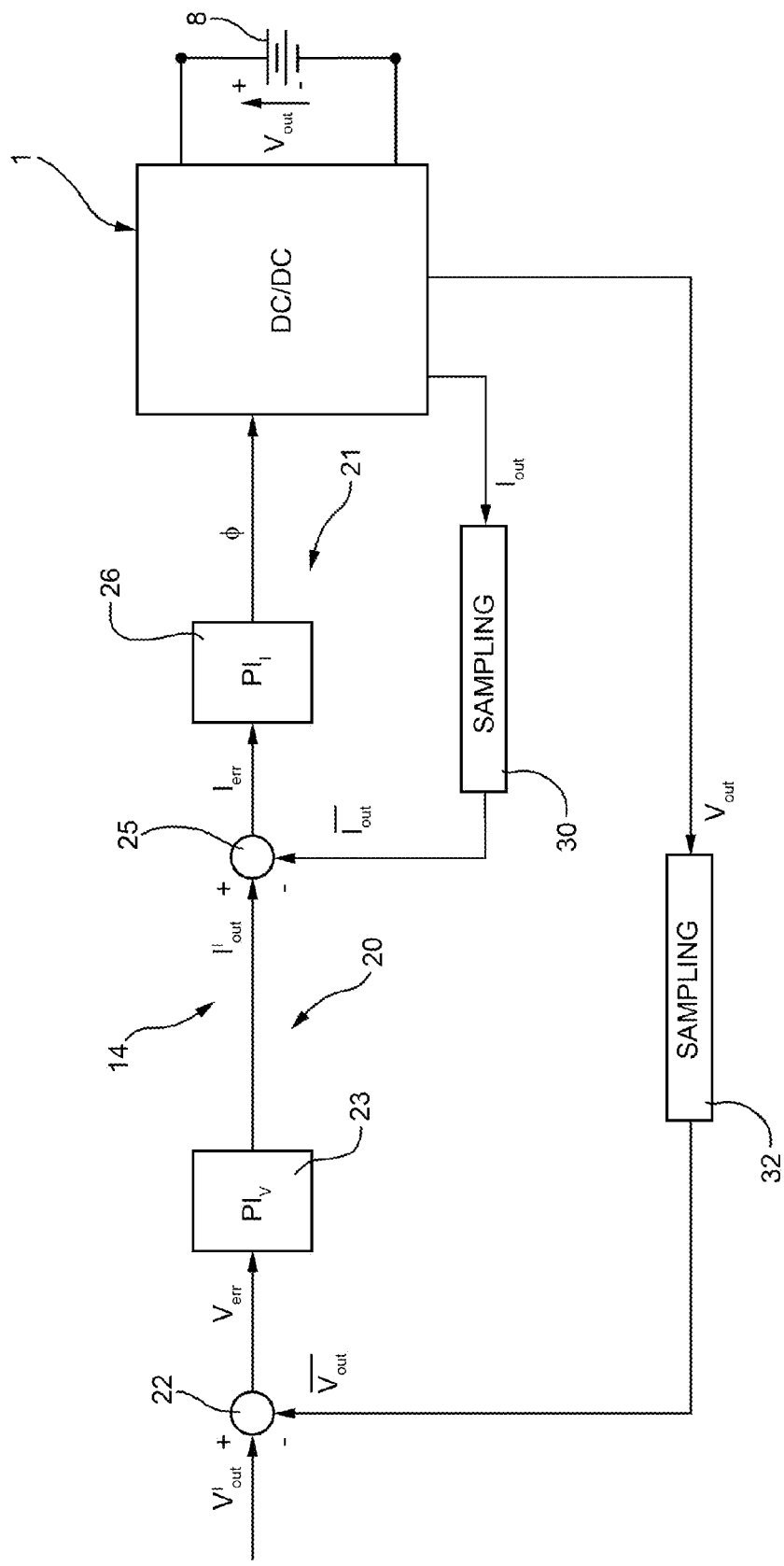
FIG. 2 shows a block diagram of a control stage of the power-converter device of FIG. 1.

The control stage 14 receives at its input, as electrical signals on the basis of which to carry out the control action (which will be described in detail hereinafter with reference also to FIG. 2), a first measurement signal, indicative of the output voltage Vout on the second battery 8, and a second measurement signal, indicative of the output current Iout circulating through the filter inductor 12. On the basis of the value of these electrical signals, the control stage 14 generates and supplies at output the command signals S1-S6 for the transistors T1-T6, which have desired values of duty cycle D and mutual phase offset, designated in what follows by Φ, and are designed to control selective switching of the same transistors at desired time intervals.

General operation of the power-converter device 1, for recharging the second electric battery 8 starting from the first electric battery 2, envisages that the transistors T1-T4 of the power switching stage 4 are switched synchronously in pairs by the control stage 14. In particular, the command signals, constituted by periodic pulse trains (for example, square-wave signals) at a switching frequency fc, for example of 100 kHz, are synchronous in pairs: S1, S2 and S3, S4. The control stage 14 is able to adjust the phase offset Φ between the command signals of the aforesaid two pairs of transistors in such a way as to vary a duty cycle D of the signal that is present on the primary of the transformer 5 (constituted by an a.c. signal made up of positive and negative pulses with a width defined by the duty cycle D). Control of the duty cycle D enables regulation of the direct transfer of energy from the primary to the secondary of the transformer 5 and hence of the value of the output voltage Vout. In addition, the control stage 14 generates the command signals S5 and S6 for the fifth and sixth transistors T5, T6, in such a way that they are synchronous with respective command signals of the aforesaid two pairs of transistors (for example, with the command signal S1, and the command signal S3, respectively).

Operation of the control stage 14 is such as to define a first half-period and a second half-period in the operation of the power-converter device 1 (associated to switching of a respective pair of transistors T1, T4 and T2, T3); during each half-period a turning-on step (in which the voltage across the primary of the transformer 5 is non-zero) and a recirculation step (in which the same voltage is substantially zero) are envisaged; during switchings of transistors T1-T4, the current circulating in the primary of the transformer 5 is used for charging the capacitances of the parasitic capacitors C1-C4, in such a way that each transistor T1-T4 is then turned on in a condition in which the corresponding drain-to-source voltage is substantially zero (ZVT condition, which is designed, to reduce the conduction losses of the power switching stage 4).

It may be noted in particular that the power-converter device 1 works in a non-isofrequential way at the primary and at the secondary of the transformer 5: at the primary, the electrical signals have in fact a first operating frequency f1, equal to the switching frequency fc of the command signals S1-S6 of the power switching stage 4, in the example 100 kHz; whereas at the secondary, on account evidently of the action of the rectifier stage 6, the electrical signals have a second operating frequency f2, equal to twice the first operating frequency f1, in the example 200 kHz. In particular, the measurement signals referred to the output voltage Vout and to the output current Iout, used for the control action exerted by the control stage 14, have the second operating frequency f2, in the example 200 kHz.

An aspect of some embodiments envisages a particular implementation of the control stage 14, which will be described in detail with reference to FIG. 2; as indicated previously, the control stage 14 performs a switching control of a digital type in the average-current mode by sampling the output current Iout in the filter inductor 12 at a sampling frequency fs.

The value of the sampling frequency fs is chosen so as to be lower than the switching frequency fc (and hence lower than both the first operating frequency f1 and the second operating frequency f2), in particular being a submultiple of the switching frequency fc. For example, the values of these frequencies satisfy the relation: fc/4<fs<fc (or, likewise: f1/4<fs<f1; or again, given the relation between the operating frequencies: f2/8<fs<f2/2). In the exemplary embodiment that will now be described, where the value of the switching frequency fc is 100 kHz, the sampling frequency fs hence falls in the range comprised between 25 kHz and 100 kHz, being, for example, chosen equal to one half of the switching frequency fc, i.e., to the value of 50 kHz.

It may be noted that the choice indicated for the value of the sampling frequency fs entails a heavy subsampling of the measurement signals on the basis of which to carry out the control action; in fact, sampling rules (based upon Nyquist's theorem) would suggest a value of the sampling frequency equal to at least twice the operating frequency (in the example 400 kHz), hence a value eight times higher than the value envisaged in the aforesaid exemplary embodiment.

The present Applicant has in fact realized, on the basis of theoretical considerations and several experimental tests, that the use of a sampling frequency fs in the range of values indicated, and of the consequent resulting subsampling, does not entail significant drawbacks in the control of the power-converter device 1, on the hypothesis that, as is now described, an average-current-mode control of a digital type is implemented.

In general, the control stage 14 is based upon two digital loops nested into one another, and in particular: an external voltage loop, with crossover frequency for example around 500 Hz, which is designed to compare a measurement of the output voltage Vout present at the output of the power-converter device 1 with a desired (or target) voltage, for supplying at output a desired current requirement; and an internal current loop, with crossover frequency for example around 5 kHz (i.e., at least one decade less than the sampling frequency $f_s$), designed to compare the desired current requirement determined by the error amplifier of the external voltage loop with a measurement of the output current Iout that flows in the filter inductor 12, for supplying at output a phase-offset requirement Φ between the waveform of the command signals with which the switches T1-T4 of the power switching stage 4, at the primary of the transformer 5, are actuated.

In greater detail, the control stage 14, which is implemented for example by a microprocessor, a microcontroller, or a similar digital computing and processing tool, comprises (see FIG. 2), a voltage control loop 20 and a current control loop 21, nested into one another and operating jointly for generating the value of phase offset Φ (and, more in general, for generating the aforesaid command signals S1-S6).

In particular, the voltage control loop 20 comprises: a first subtractor block 22, which computes the difference between a desired voltage value for the output voltage Vout across the second electric battery 8, designated by Vout', and a measured value (measured via appropriate sampling) of the same output voltage Vout, designated by $\overline{\text{Vout}}$, for generating at output an error voltage Verr; and a first proportional-integral (PI) controller block 23, voltage operating, connected to the output of the subtractor block 22, and designed to generate a desired current value, designated by Iout', for the output current Iout circulating in the filter inductor 12.

The current control loop 21 comprises: a second subtractor block 25, which computes the difference between the aforesaid desired current value Iout' and a measured value (measured via appropriate sampling) of the output current Iout, designated by $\overline{\text{Iout}}$, for generating at output an error current Ierr; and a second proportional-integral (PI) controller block 26, current operating, connected to the output of the second subtractor block 25 and designed to generate at its output the value of phase offset Φ for control of the power switching stage 4 of the power-converter device 1.

The control action, performed in particular by the first and second proportional-integral controller blocks 23, 26, causes the output voltage Vout and the output current Iout to assume the respective desired values, minimizing, that is, the respective error voltage and error current Verr, Ierr, and thus generating an appropriate value of the phase offset Φ (as well as the value of duty cycle D, and in general the various command signals S1-S6).

In greater detail, the measured value $\overline{\text{Iout}}$ of the output current is generated via an operation of sampling of the output current Iout at the sampling frequency fs, performed by a first sampling block 30. In particular, if T is the switching period, and D·T is the active portion of the same switching period T (having a width corresponding to the value of duty cycle D), the output current Iout is sampled at the instant D·T/2 (i.e., at half of the active portion of the switching period T). By sampling at this instant it is in fact possible to obtain a current value basically corresponding to a mean value of the output current Iout within the period T (it is in fact possible to verify that the waveform of the output current Iout has a minimum at the initial instant of the active portion of the period T and a maximum at the instant D·T).

Similar sampling operations are executed also on the output voltage Vout by a second sampling block 32, for generating the measured value $\overline{\text{Vout}}$.

In any case, it is emphasized that the control scheme described, and the corresponding subsampling, enable the use of a reduced sampling frequency fs, lower than the operating frequency of the circuit (in particular, lower than the corresponding switching frequency fc). Consequently, it is possible to use microprocessors or microcontrollers having performance levels (and associated costs) lower than those of traditional solutions, albeit without abandoning the high operating frequencies in the circuit and the associated advantages of reduction of the dimensions of the analog circuit components.

It is again emphasized that the control scheme envisages that the sampling frequency fs is lower than both the operating frequency f2 on the secondary of the transformer 5 and the operating frequency f1 on the primary of the transformer (considering the non-isofrequentiality of operation of the power-converter device 1). In this regard, it is moreover emphasized that, in a way here not illustrated in detail the control scheme moreover envisages sampling of appropriate control signals on the primary of the transformer 5 (for example sampling of the voltage across the decoupling capacitor 3, to verify that this voltage will not rise beyond safety levels). Operation of the microprocessor or microcontroller that exerts the control action envisages also in this case a subsampling of the measured control signals.

In general, the sampling frequency fs is chosen in such a way that it is a submultiple of the operating frequencies in the circuit; evidently, the more marked the subsampling ratio (in any case guaranteeing an adequate robustness of the control action), the more it is possible to use low-performance and low-cost processors.

It may be noted that the sensible reduction in the costs of production of the power-converter device 1, which is not in any case detrimental to the performance, proves particularly advantageous for automotive applications, for example for the use in a battery-charger device of a hybrid electric vehicle for recharging the corresponding service battery.

Finally, it is clear that modifications and variations may be made to what has been described and illustrated herein, without thereby departing from the scope of the present invention, as defined in the appended claims.

For example, it is evident that the specific values of the switching and sampling frequencies fc and fs, previously indicated for the power-converter device 1, as likewise the values of some of the electrical quantities in the circuit, are to be understood as being provided purely by way of non-limiting indication.

In addition, the particular implementation of the stages of the power-converter device 1 may vary with respect to what has been described (for example, the power switching stage 4 may have a half-bridge configuration, or the rectifier stage be made up of a diode bridge that is not controlled and not synchronous with the primary of the transformer 5), without this in any case involving the need for substantial modifications to the control scheme.

The control schema previously described finds advantageous application also in non-automotive contexts, in all those situations in which it is advantageous to use a digital-control DC/DC power-converter device and it is desired to obtain a reduction of the corresponding production costs.

The invention claimed is:

1. A system for controlling a power-converter device of a DC/DC type, said power-converter device having an input, configured to be connected to a first electric battery, which supplies an input voltage (Vin), and an output, configured to be connected to a second electric battery for supplying an output voltage (Vout), and being provided with: a transformer stage, having a primary winding, coupled to said input, and at least one secondary winding, coupled to said output; and a switching stage, arranged between said input and said primary winding and configured so as to generate an alternating electrical quantity on said primary winding as a function of said input voltage (Vin); and a rectifier stage, arranged between said secondary winding and said output for generating said output voltage (Vout);

said control system comprising a control stage, operatively coupled to said switching stage and configured so as to control switching operation thereof at a switching frequency (fc), as a function of at least a first measurement signal ($\overline{Vout}$, $\overline{Iout}$) indicative of a first electrical output quantity (Vout, Iout) configured to be detected at said output, wherein, said control stage is configured so as to perform a control of a digital type in average-current mode (ACM), and so as to obtain said first measurement signal ($\overline{Vout}$, $\overline{Iout}$) by means of a subsampling of said first electrical output quantity, at a sampling frequency (fs) of a lower value than said switching frequency (fc).

2. The system according to claim 1, wherein:
said first electrical output quantity is an output current (Iout) circulating through said rectifier stage towards said output; and
said control stage is configured so as to control switching operation of said switching stage as a function also of a second measurement signal ($\overline{Vout}$) indicative of said output voltage (Vout).

3. The system according to claim 1, wherein said sampling frequency (fs) is a submultiple of said switching frequency (fc).

4. The system according to claim 1, wherein the value of said sampling frequency (fs) is equal to one half of the value of said switching frequency (fc).

5. The system according to claim 1, wherein the value of said sampling frequency (fs) is 50 kHz and the value of said switching frequency (fc) is 100 kHz.

6. The system according to claim 1, wherein:
said alternating electrical quantity on said primary winding of said transformer stage has a first operating frequency (f1) equal to said switching frequency (fc); and
said first electrical output quantity (Vout, Iout) has a second operating frequency (f2) equal to twice said switching frequency (fc), said sampling frequency (fs) being lower than both said first operating frequency (f1) and said second operating frequency (f2).

7. The system according to claim 1, wherein:
said switching stage includes a bridge of switches, each of said switches being configured to receive a respective command signal from said control stage; and
said switches are configured to be controlled synchronously in pairs, and said control stage is configured so as to control a phase offset ($\Phi$) between the command signals supplied to said pairs, via said digital average-current-mode control.

8. The system according to claim 2, wherein said control stage comprises:
an external voltage control loop, configured so as to cause said output voltage (Vout) to assume a desired voltage value (Vout') and so as to generate accordingly a desired current value (Iout'); and
an internal current control loop, nested within said external voltage control loop and configured so as to cause said output current (Iout) to assume said desired current value (Iout') and so as to generate accordingly command signals for said switching stage.

9. The system according to claim 1, for automotive applications, wherein said first electric battery is a traction battery of an electric vehicle, and said second electric battery is a service battery of said electric vehicle; said power-converter device being configured so as to charge said second electric battery starting from said first electric battery.

10. A computer-program product, comprising software instructions configured to be executed by a processing unit of said control stage of said control system so as to cause said control stage to be configured in accordance with claim 1.

11. A battery-charger device for recharging, starting from a first electric battery, a second electric battery, said battery-charger device comprising:
a DC/DC power-converter device having at least one input, configured to be connected to said first electric battery, which supplies an input voltage (Vin), and at least one output, configured to be connected to said second electric battery for supplying an output voltage (Vout), and being provided with:

a transformer stage, having a primary winding coupled to said input, and a secondary winding coupled to said output;

a switching stage, arranged between said input and said primary winding and configured so as to supply an alternating electrical quantity to said primary winding, as a function of said input voltage (Vin);

a rectifier stage, arranged between said secondary winding and said output, for generating said output voltage (Vout); and a control stage, operatively coupled to said switching stage and configured so as to control switching operation thereof at a switching frequency (fc), as a function of at least a first measurement signal ($\overline{\text{Vout}}$, $\overline{\text{Iout}}$) indicative of a first electrical output quantity (Vout, Iout) configured to be detected at said output, wherein, said control stage is configured so as to carry out a control of a digital type in average-current mode (ACM), and so as to obtain said first measurement signal ($\overline{\text{Vout}}$, $\overline{\text{Iout}}$) by means of a subsampling of said first electrical output quantity, at a sampling frequency (fs) of a value lower than said switching frequency (fc).

12. A method for controlling a power-converter device of a DC/DC type, said power-converter device having at least one input, configured to be connected to a first electric battery supplying an input voltage (Vin), and at least one output, configured to be coupled to a second electric battery for supplying an output voltage (Vout), and being provided with: a transformer stage, having a primary winding coupled to said input, and a secondary winding coupled to said output; a switching stage, arranged between said input and said primary winding and configured so as to supply an alternating electrical quantity to said primary winding, as a function of said input voltage (Vin); and a rectifier stage, arranged between said secondary winding and said output, for generating said output voltage (Vout);

said method comprising controlling a switching operation of said switching stage (4) at a switching frequency (fc) as a function of at least a first measurement signal ($\overline{\text{Vout}}$, $\overline{\text{Iout}}$) indicative of a first electrical output quantity (Vout, Iout) configured to be detected at said output (OUT1, OUT2), wherein, said controlling a switching operation comprises:

performing a digital control in average-current mode (ACM); and obtaining said first measurement signal ($\overline{\text{Vout}}$, $\overline{\text{Iout}}$) by means of a subsampling of said first electrical output quantity, at a sampling frequency (fs) of a value lower than said switching frequency (fc).

13. The method according to claim 12, wherein said sampling frequency (fs) is a submultiple of said switching frequency (fc).

14. The method according to claim 12, wherein the value of said sampling frequency (fs) is equal to one half of the value of said switching frequency (fc).

15. The method according to claim 12, wherein said alternating electrical quantity on said primary winding of said transformer stage has a first operating frequency (f1) equal to said switching frequency (fc); and wherein said first electrical output quantity (Vout, Iout) has a second operating frequency (f2) equal to twice said switching frequency (fc); said sampling frequency (fs) being lower than both said first operating frequency (f1) and said second operating frequency (f2).

* * * * *